United States Patent [19]
Chung et al.

[11] Patent Number: 5,108,791
[45] Date of Patent: Apr. 28, 1992

[54] HEAT-CURABLE SILICONE COMPOSITIONS HAVING IMPROVED BATH LIFE

[75] Inventors: Kyuha Chung; Antony P. Wright; Ming-Hsiung Yeh, all of Midland County, Mich.

[73] Assignee: Dow Corning Corporation, Midland, Mich.

[21] Appl. No.: 677,938

[22] Filed: Apr. 1, 1991

Related U.S. Application Data

[62] Division of Ser. No. 431,352, Nov. 3, 1989, Pat. No. 5,036,117.

[51] Int. Cl.⁵ ............................................. B05D 5/10
[52] U.S. Cl. ............................. 427/208.8; 427/387; 427/391; 427/411
[58] Field of Search ............... 427/387, 208.8, 391, 427/411

[56] References Cited

U.S. PATENT DOCUMENTS 4,774,111  9/1988  Lo .................................... 427/387

*Primary Examiner*—Michael Lusignan
*Attorney, Agent, or Firm*—George A. Grindahl

[57] ABSTRACT

A curable organosilicon composition comprises a component having silicon-bonded hydrogen atoms, a component having silicon-bonded radicals reactive therewith, a curing catalyst, a catalyst-inhibitor and a bath life extender. The use of certain compounds, which are ineffective as a bath life extender in the absence of a catalyst inhibitor, effectively extend the room temperature bath life of a silicone coating composition containing a catalyst inhibitor. Being a substantial non-inhibitor for the catalyst the bath life extender component does not effect the cure time and/or cure temperature of the composition.

This discovery has permitted the preparation of curable coating compositions which have a long bath life at room temperature and a rapid cure time at elevated temperatures which does not drift to longer intervals as the coating compositions ages over a typical production run.

The room temperature cure times of the organopolysiloxane coating compositions of this invention are adequately long, and their cure times at elevated temperature are advantageously brief, that they are useful in fast-paced coating operations, such as adhesive release coating operations wherein the cured coating is further coated with an adhesive in-line, i.e., immediately after being cured.

8 Claims, No Drawings

HEAT-CURABLE SILICONE COMPOSITIONS HAVING IMPROVED BATH LIFE

This is a divisional of copending application Ser. No. 07/431,352 filed on Nov. 3, 1989, now U.S. Pat. No. 5,036,117.

BACKGROUND OF THE INVENTION

The present invention relates to improved compositions which cure by way of a precious metal-catalyzed reaction of silicon-bonded radicals and have an improved bath life. The present invention further relates to an improved process for using said compositions.

Organosilicon compositions in which a platinum group metal-containing catalyst is inhibited in its cure-promoting activity at room temperature by the presence of a catalyst inhibitor are well known in the organosilicon art and need no detailed discussion herein.

Among the many inhibitors of the art the maleate inhibitors of U.S. Pat. Nos. 4,256,870 and 4,562,096, and the fumarate inhibitors of U.S. Pat. No. 4,774,111, are of particular concern.

The maleates have been found to be particularly effective for increasing the room temperature bath life, i.e. work time, of solventless coating organosilicon compositions which cure by way of a platinum group metal-catalyzed reaction. However, the heating time and/or temperature needed to cure these maleate-inhibited compositions are/is sometimes excessive. When one attempts to decrease the cure time and/or temperature of these compositions to a commercially desirable interval by using less maleate and/or more catalyst the bath life is frequently decreased to a commercially undesirable interval.

The fumarate inhibitors have been found to allow a cure of a solventless coating organosilicon compositions which cure by way of a platinum group metal-catalyzed reaction to take place at a suitable heating time and/or temperature. However, the bath life of such a composition, as measured by gel time at room temperature, is not as long as desired. When one attempts to increase the bath life of these compositions by increasing the amount of fumarate and/or decreasing the amount of catalyst the cure time and/or temperature increases.

This problem of increased cure time and/or cure temperature with increased bath life in an inhibited platinum group metal-catalyzed system is of particular significance for applications where the organosilicon composition is used to rapidly coat a substrate over a long period of time. In such a process a long bath life coupled with a short cure time, preferably at low-to-moderate temperature, is an essential property of the coating composition.

In the coating arts, such as the paper coating art, the coating composition that is used to coat a substrate should not cure to the extent that its viscosity has increased substantially before it has been applied to the substrate; however, it should rapidly cure thereafter, preferably with only a moderate amount of added energy. Typically this means that the coating compositions preferably should not gel for as long as eight hours but should cure rapidly at moderately increased temperature to such an extent that the coated substrate can be further processed, if desired, without damaging the coating. In addition, the cure time of the composition at a given cure temperature desirably should remain substantially constant as the bath ages.

In the preparation of laminates comprising a peelable release paper bearing a cured coating and an adhesive film releasably adhered thereto, such as a stick-on label, one of two processes is normally used. In one process, the off-line process, the silicone composition is coated on paper and cured; then, at a later time, an adhesive film is applied to the cured silicone coating. In the other process, the in-line process, the silicone composition is applied to paper and cured and the adhesive is then immediately coated on the cured silicone coating. While the in-line process is generally more efficient and would normally be more advantageous, it has been found that some adhesives bond, i.e. weld, to the silicone coated paper if the adhesive is applied to the silicone coated paper within a short time after the silicone composition has been cured. It is believed that residual reactivity in the cured silicone coating is responsible for the welding of the silicone and adhesive in the in-line process.

While the art has proposed and provided some solutions for the welding problem there is a need for further improvements in a release-coating composition for in-line lamination of adhesives which cures at lower temperature and/or has a longer bath life.

There is also interest in applying silicone release coatings to substrates, such as polyethylene sheets, which are less stable at the elevated temperatures used to cure the silicone release coatings of the art. Consequently there is a need for silicone coatings which cure at reduced temperatures. Of course, silicone coatings which have lower curing temperatures or faster curing rates are also desired for energy conservation and for more efficient production processes.

BRIEF SUMMARY OF THE INVENTION

It is an object of this invention to provide improved curable organosilicon compositions. It is also an object of this invention to provide organopolysiloxane compositions which do not cure at room temperature for long periods of time but which cure rapidly when heated to moderately elevated temperatures and/or irradiated with actinic radiation. It is an additional object of this invention to provide curable coating compositions and a process for preparing adhesive release liners. It is a further object of this invention to provide a way to control the cure of a platinum group metal-catalyzed organopolysiloxane composition so as to provide for the composition a short cure time at moderately elevated temperatures which does not drift, i.e., change, as the curable composition ages at room temperature.

These objects, and others which will occur to one of ordinary skill in the curable organosilicon composition art upon considering the following disclosure and appended claims, are obtained by the present invention which, briefly stated, comprises a curable organosilicon composition comprising a component having silicon-bonded hydrogen atoms, a component having silicon-bonded hydroxyl and/or olefinic hydrocarbon radicals reactive therewith, a platinum group metal-containing catalyst, and a cure-control component comprising an inhibitor component and a bath life extender component, said components hereinafter being delineated. In a preferred embodiment the inhibitor component is used in an amount which is insufficient, by itself, to provide adequate bath life for the composition; however, in the presence of the bath life extender component an adequate bath life is obtained.

According to the present invention it has been surprisingly discovered that the use of certain compounds, which are ineffective by themselves as a bath life extender in the absence of a catalyst inhibitor, effectively extend the room temperature bath life of a platinum group metal-catalyzed silicone coating composition containing a catalyst inhibitor. Being a substantial non-inhibitor for the metal-containing catalyst the bath life extender component does not effect the curing behavior of the composition at elevated temperature. Thus, in combination, the inhibitor component and the bath life extender component regulates the heat-curing of the composition and its room temperature stability.

This discovery has permitted the preparation of curable coating compositions which not only have improved bath life but, unexpectedly, have the stable cure profile of the hydrocarbonoxyalkyl maleate-inhibited compositions of U.S. Pat. No. 4,562,096. That is to say, the compositions of the present invention possess long bath lives at room temperature and a rapid cure time at elevated temperatures which does not drift, i.e. change to a different cure time, as the coating compositions ages over a typical production run.

The room temperature cure times of the coating compositions of this invention are adequately long, and their cure times at elevated temperature are advantageously brief, that they are useful in fast-paced coating operations, such as adhesive release coating operations wherein the cured coating is further coated with an adhesive in-line, i.e., immediately after being cured.

While not limiting the present invention with any particular theory, we believe that the bath life extender component provides its benefits by becoming loosely associated with, and forming a protective layer around, a catalyst/inhibitor complex. One theory for this protective action proposes a micelle-type construction wherein the catalyst/inhibitor complex is surrounded by a layer of bath life extender molecules in a manner which results in a more complete blocking of available coordination sites on the catalyst/inhibitor complex at room temperature, thereby delaying a reaction of silicon-bonded hydrogen atoms with silicon-bonded hydroxy or olefinic hydrocarbon radicals and/or, when reaction does take place, delaying the departure of reaction products from the catalyst/inhibitor complex. In fact, the most effective materials to be used as the bath life extender component in the compositions of this invention are non-inhibitors for a platinum group metal-containing catalyst, especially the below-noted preferred complex of chloroplatinic acid and a vinylsiloxane. At elevated temperatures the loosely associated bath life extender molecules are thought to be easily disassociated from the catalyst/inhibitor complex.

DETAILED DESCRIPTION OF THE INVENTION

The present invention relates to a curable composition comprising (A) an organosilicon compound having an average of at least two curing radicals per molecule thereof selected from the group consisting of the hydroxy radical and olefinic hydrocarbon radicals, (B) an organohydrogensilicon compound containing an average of at least two silicon-bonded hydrogen atoms per molecule thereof, the amounts of Components (A) and (B) being sufficient to provide a ratio of the number of silicon-bonded hydrogen atoms to the number of silicon-bonded curing radicals of from 1/100 to 100/1, (C) a platinum group metal-containing catalyst in sufficient amount to accelerate a curing reaction among said silicon-bonded curing radicals and said silicon-bonded hydrogen atoms, (D) an inhibitor compound for said accelerated curing reaction in a total amount sufficient to retard the curing reaction at room temperature but insufficient to prevent said reaction at elevated temperature, and (E) a bath life extender compound in a total amount sufficient to further retard the curing reaction at room temperature.

Herein the term "curable", as applied to compositions of this invention, generally denotes a chemical change which leads to a change in the state of the composition from a liquid to a solid. For coating compositions of this invention which are to be used as adhesive-release coatings the term "curable" has a more detailed meaning which encompasses the absence of smear, migration and rub-off of the coating, as delineated below.

The curing of the compositions of this invention is accomplished by a reaction between silicon-bonded hydroxy and/or olefinic hydrocarbon radicals in Component (A) and silicon-bonded hydrogen atoms in Component (B). The curing of the compositions of this invention is controlled by the platinum group metal-containing catalyst Component (C), the inhibitor Component (D) and the bath life extender Component (E). These components are delineated as follows.

Component (A) of the compositions of this invention can be any organosilicon compound containing at least one silicon atom and from 1 to 4 silicon-bonded monovalent radicals per silicon; with the proviso that the organosilicon compound contains at least two silicon-bonded curing radicals selected from the hydroxy radical and olefinic hydrocarbon radicals. This component can be a solid or a liquid having any viscosity, such as a freely flowing, gum-like material or a hydrocarbon-soluble resin.

Multiple silicon atoms in Component (A) are linked by divalent radicals which include oxygen atoms, which provide siloxane bonds, and aliphatically saturated hydrocarbon, hydrocarbon ether, halohydrocarbon ether and halohydrocarbon radicals which provide silcarbane bonds. The divalent radicals in Component (A) can be the same or different, as desired. Preferred divalent hydrocarbon radicals are 1-20 carbon atom alkylene radicals.

The monovalent radicals in Component (A) can contain up to 20 carbon atoms and include halohydrocarbon radicals free of aliphatic unsaturation, hydrocarbon radicals and hydroxy radicals.

Monovalent hydrocarbon radicals include alkyl radicals, such as methyl, ethyl, propyl, butyl, hexyl and octyl; cycloaliphatic radicals, such as cyclohexyl; aryl radicals, such as phenyl, tolyl and xylyl; aralkyl radicals, such as benzyl and phenylethyl; and olefinic hydrocarbon radicals, such as vinyl, allyl, methallyl, butenyl, hexenyl, octenyl, cyclohexenyl and styryl. Alkenyl radicals are preferably terminally unsaturated. Of the higher alkenyl radicals those selected from the group consisting of 5-hexenyl, 7-octenyl, and 9-decenyl are preferred because of the more ready availability of the alpha, omega-dienes that can be used to prepare the alkenylsiloxanes. Highly preferred monovalent hydrocarbon radical for the silicon-containing components of the compositions of this invention are methyl, phenyl, vinyl and 5-hexenyl.

Monovalent halohydrocarbon radicals free of aliphatic unsaturation include any monovalent hydrocarbon radical noted above which is free of aliphatic unsaturation and has at least one of its hydrogen atoms replaced with halogen, such as fluorine, chlorine or bromine. Preferred monovalent halohydrocarbon radicals have the formula $C_nF_{2n+1}CH_2CH_2$—wherein the subscript n has a value of from 1 to 10, such as, for example, $CF_3CH_2CH_2$— and $C_4F_9CH_2CH_2$—.

Component (A) of the compositions of this invention is typically an organopolysiloxane having the average unit formula $R_c^2SiO_{(4-c)/2}$ wherein $R^2$ denotes said monovalent radical, delineated and limited above, and the subscript c has a value of from 1 to 3, such as 1.0, 1.2, 1.9, 2.0, 2.1, 2.4 and 3.0. The organopolysiloxanes having the above average unit formula contain siloxane units having the formulae $R_3^2SiO_{1/2}$, $R_2^2SiO_{2/2}$, $R^2SiO_{3/2}$ and $SiO_{4/2}$. Said siloxane units can be combined in any molecular arrangement such as linear, branched, cyclic and combinations thereof, to provide organopolysiloxanes that are useful as Component (A).

A preferred organopolysiloxane Component (A) for the composition of this invention is a substantially linear organopolysiloxane having the formula $XR_2SiO(XRSiO)_xSiR_2X$. By the term "substantially linear" it is meant that the component contains no more than trace amounts of silicon atoms bearing 3 or 4 siloxane linkages or silicon atoms bearing more than 1 hydroxy radical but up to about 15 percent by Weight cyclopolydiorganosiloxanes which are frequently co-produced with the linear organopolysiloxanes.

In the formula shown immediately above each R denotes a monovalent hydrocarbon or halohydrocarbon radical free of aliphatic unsaturation and having from 1 to 20 carbon atoms, as exemplified above. The several R radicals can be identical or different, as desired. Independently, each X denotes hydroxy, R or an olefinic hydrocarbon radical having from 2 to 20 carbon atoms, as exemplified above. Of course, at least two X radicals are hydroxy or olefinic hydrocarbon radicals. For the coating compositions and process of this invention X is preferably an olefinic hydrocarbon radical and at least 50 percent of all R radicals are methyl.

The value of the subscript x in the above formula is such that the linear organopolysiloxane (A) has a viscosity at 25° C. of at least 25 millipascal-seconds (25 centipoise). The exact value of x that is needed to provide a viscosity value meeting said limit depends upon the identity of the X and R radicals; however, for hydrocarbyl-terminated polydimethylsiloxane x will have a value of at least 25.

In terms of preferred monovalent hydrocarbon radicals, noted above, examples of linear organopolysiloxanes of the above formula which are suitable as Component (A) for the composition of this invention include $HO\{Me(CF_3CH_2CH_2)SiO\}_xH$, $HO(Me_2SiO)_xH$, $HO\{(Me_2SiO)_{0.9}(MeViSiO)_{0.1}\}_xH$, $ViMe_2SiO(Me_2SiO)_xSiMe_2Vi$, $HexMe_2SiO(Me_2SiO)_xSiMe_2Hex$, $Hex-Me_2SiO(Me_2SiO)_{0.95x}(MeHexSiO)_{0.05x}SiMe_2Hex$, $Me_3SiO(Me_2SiO)_{0.9x}(MeViSiO)_{0.1x}SiMe_3$, $ViMe_2SiO(Me_2SiO)_{0.95x}(MeViSiO)_{0.05x}SiMe_2Vi$, $Me_3SiO(Me_2SiO)_{0.9x}(MeHexSiO)_{0.1x}SiMe_3$, and $PhMeViSiO(Me_2SiO)_{0.93x}(MePhSiO)_{0.07x}SiPhMeVi$ wherein Me, Vi, Hex and Ph denote methyl, vinyl, 5-hexenyl and phenyl, respectively.

For coating composition of this invention it is highly preferred that the linear organopolysiloxanes (A) have the formula $XMe_2SiO(Me_2SiO)_b(MeXSiO)_dSiMe_2X$ wherein X is as noted above and the sum of the subscripts b plus d is equal to x, also noted above. The values of the subscripts b and d can each be zero or greater; however, the value of d is typically less than 10% of the value of b.

In a preferred embodiment of the present invention, wherein the curable composition is used to coat a solid substrate, such as paper, with an adhesive-releasing coating, the value of b plus d in the highly preferred organopolysiloxane (A) is sufficient to provide a viscosity at 25° C. for the Component (A) of at least 100 mPa.s, such as from about 100 mPa.s to about 100 Pa.s, preferably from about 100 mPa.s to 10 Pa.s and, most preferably, from 100 mPa.s to 5 mPa.s; said viscosities corresponding approximately to values of B+d of at least 60, such as from 60 to 1000, preferably 60 to 520 and, most preferably, 60 to 420, respectively. In addition, the value of subscript d is preferably limited to less than 0.1 b as noted above.

Component (B) of the compositions of this invention can be any organohydrogensilicon compound which is free of aliphatic unsaturation and contains two or more silicon atoms linked by divalent radicals, an average of from one to two silicon-bonded monovalent radicals per silicon atom and an average of at least two, and preferably three or more, silicon-bonded hydrogen atoms per molecule thereof. Preferably Component (B) contains an average of three or more silicon-bonded hydrogen atoms such as, for example, 5, 10, 20, 40 and more.

Divalent radicals linking silicon atoms in Component (B) are as delineated above for Component (A), including preferred examples. As with Component (A), the divalent radicals within Component (B) can be identical or different, as desired. Furthermore, the divalent radicals that are present in Component (B) can, but need not, be the same as the divalent radicals that are present in Component (A).

Monovalent radicals in Component (B) include monovalent hydrocarbon and halohydrocarbon radicals free of aliphatic unsaturation, as delineated above for Component (A), including preferred examples. The monovalent radicals that are present in Component (B) are preferably, but need not be, the same as the monovalent radicals that are present in Component (A).

Component (B) of the compositions of this invention is an organohydrogenpolysiloxane having the average unit formula $R_e^3H_fSiO_{(4-e-f)/2}$ wherein $R^3$ denotes said monovalent radical free of aliphatic unsaturation, the subscript f has a value of from greater than 0 to 1, such as 0.001, 0.01, 0.1 and 1.0, and the sum of the subscripts e plus f has a value of from 1 to 3, such as 1.2, 1.9 and 2.5. Siloxane units in the organohydrogenpolysiloxanes having the average unit formula immediately above have the formulae $R_3^3SiO_{1/2}$, $R_2^3HSiO_{1/2}$, $R_2^3SiO_{2/2}$, $R^3HSiO_{2/2}$, $R^3SiO_{3/2}$, $HSiO_{3/2}$ and $SiO_{4/2}$. Said siloxane units can be combined in any molecular arrangement such as linear, branched, cyclic and combinations thereof, to provide organohydrogenpolysiloxanes that are useful as Component (B).

A preferred organohydrogenpolysiloxane Component (B) for the compositions of this invention is a substantially linear organohydrogenpolysiloxane having the formula $YR_2SiO(YRSiO)_ySiR_2Y$ wherein each R denotes a monovalent hydrocarbon or halohydrocarbon radical free of aliphatic unsaturation and having from 1 to 20 carbon atoms, as exemplified above. The several R radicals can be identical or different, as desired. Additionally, each Y denotes a hydrogen atom or an R radical. Of course, at least two Y radicals must be hydrogen atoms. The value of the subscript y is not critical; however, for the coating compositions and process of this invention, it is preferably such that the organohydrogenpolysiloxane Component (B) has a viscosity at 25° C. of up to 100 millipascal-seconds. The exact value of y needed to provide a viscosity value falling within said limits depends upon the number and identity of the R radicals; however, for organohydrogenpolysiloxanes containing only methyl radicals as R radicals y will have a value of from about 0 to about 100.

In terms of preferred monovalent hydrocarbon radicals noted above, examples of organopolysiloxanes of the above formulae which are suitable as Component (B) for the compositions of this invention include $HMe_2SiO(Me_2SiO)_ySiMe_2H$, $(HMe_2SiO)_4Si$, cyclo-$(MeHSiO)_y$, $(CF_3CH_2CH_2)MeHSiO\{Me(CF_3CH_2CH_2)SiO\}_ySiHMe(CH_2CH_2CF_3)$, $Me_3SiO(MeHSiO)_ySiMe_3$, $HMe_2SiO(Me_2SiO)_{0.5y}(MeHSiO)_{0.5y}SiMe_2H$, $HMe_2SiO(Me_2SiO)_{0.5y}(MePhSiO)_{0.1y}(MeHSiO)_{0.4y}SiMe_2H$, $Me_3SiO(Me_2SiO)_{0.3y}(MeHSiO)_{0.7y}SiMe_3$ and $MeSi(OSiMe_2H)_3$.

Highly preferred linear organohydrogenpolysiloxane (B) for the coating compositions of this invention have the formula $YMe_2SiO(Me_2SiO)_p(MeYSiO)_qSiMe_2Y$ wherein Y denotes a hydrogen atom or a methyl radical. As noted above, an average of at least two Y radicals per molecule of Component (B) must be hydrogen atoms. The subscripts p and q can have average values of zero or more and the sum of p plus q has a value equal to y, noted above. The disclosure of U.S. Pat. No. 4,154,714 is incorporated herein by reference to show highly-preferred organohydrogenpolysiloxanes.

The amounts of Components (A) and (B) that are used in the compositions of this invention are not narrowly limited. Said amounts, expressed in terms of the ratio of the number of silicon-bonded hydrogen atoms of Component (B) to the number of silicon-bonded hydroxy and/or olefinic hydrocarbon radicals of Component (A), are sufficient to provide a value of from 1/100 to 100/1 for said ratio, usually from ½ to 20/1, and preferably from ½ to 2/1. For the liquid coating compositions of this invention which are to be used in the coating method of this invention, hereinbelow delineated, the value of said ratio should have a value of from ½ to 2/1, and preferably about 1/1.

Organosilicon polymers are, of course, well known in the organosilicon art. Their preparation is well documented and needs no intensive delineation herein. Organopolysiloxanes are clearly the most significant and most widely used form of organosilicon polymers in the art, and in this invention; many are commercially prepared.

Briefly, organopolysiloxanes are typically prepared by way of hydrolysis and condensation of hydrolyzable silanes such as $Me_2SiCl_2$, $Me_3SiCl$, $MeSiCl_3$, $SiCl_4$, $Me_2Si(OMe)_2$, $MeSi(OMe)_3$ and $Si(OCH_2CH_3)_4$ or by way of acid- or alkalicatalyzed siloxane equilibration of suitable siloxane precursors such as cyclo-$(Me_2SiO)_4$ and $Me_3SiOSiMe_3$, which themselves are prepared by way of said hydrolysis and condensation reactions.

Organosilicon polymers having both silcarbane and siloxane structure can be prepared, for example, from monomeric species that have non-oxygen divalent radicals, such as $O_{\frac{1}{2}}Me_2SiCH_2CH_2Me_2SiO_{\frac{1}{2}}$ or $ClMe_2SiC_6H_4SiMe_2Cl$, using standard hydrolysis and condensation reactions, noted above, and incorporating one or more of the olefinic hydrocarbon radicals or hydrogen atom-containing silanes or siloxanes noted above, and other silanes or siloxanes, as desired.

Organosilicon polymers which contain no siloxane bonds can be prepared, for example, by a hydrosilylation reaction between silanes or silcarbanes bearing silicon-bonded olefinically unsaturated hydrocarbon radicals, such as $Vi_2SiMe$, or $ViMe_2SiC_6H_4SiMe_2Vi$ and silanes or silcarbanes bearing silicon-bonded hydrogen atoms, such as $H_2SiMe_2$ or $HMe_2SiC_6H_4SiMe_2H$.

Other suitable methods for preparing the organosilicon components that are used in the compositions of this invention also occur in the organosilicon art.

Organopolysiloxane Component (A) containing olefinic hydrocarbon radicals can be prepared as noted above with the proviso that a silane or siloxane containing at least one silicon-bonded olefinic hydrocarbon radical is used, alone or in conjunction with other silanes or siloxanes, in sufficient amount to provide the necessary number of olefinic hydrocarbon radicals in the organopolysiloxane. Examples of olefinic hydrocarbon radical-containing silanes or siloxanes include, but are not limited to, $ViMe_2SiCl$, $HexMe_2SiCl$, $MeViSiCl_2$, $MeHexSiCl_2$, $ViSiCl_3$, $HexSiCl_3$, $(MeViSiO)_4$, $HexMe_2SiOSiMe_2Hex$ and $ViMe_2SiOSiMe_2Vi$.

It is usually preferred to prepare olefinic siloxanes by hydrolyzing a readily hydrolyzable silane, such as 5-hexenyl- or vinyl-methyldichlorosilane, in excess water and then equilibrating the resulting hydrolyzate with cyclopolydimethylsiloxanes and a siloxane oligomer containing triorganosiloxane end groups, using a base catalyst such as KOH. However, it is believed that olefinic polydiorganosiloxanes may also be advantageously prepared in a one-step acid-catalyzed process wherein the hydrolyzable silane is hydrolyzed and simultaneously equilibrated with cyclopolydimethylsiloxanes and siloxane oligomer containing end groups.

Alternatively, known polyorganohydrogensiloxanes bearing reactive SiH groups can be reacted with an alpha, omega-diene, such as 1,5-hexadiene, to prepare higher alkenyl-substituted organopolysiloxanes. It should be noted that linear siloxanes produced by equilibration procedures may contain small amounts, such as 0 to 15 weight percent, of cyclopolydiorganosiloxanes which may be volatile at temperatures up to 150° C. For the purposes of this invention either siloxanes that still contain the small amounts of cyclics or siloxanes from which the co-produced cyclics have been removed by volatilization may be used.

Organohydrogenpolysiloxane Component (B) can be prepared as noted above with the proviso that a silane or siloxane containing at least one silicon-bonded hydrogen atom, instead of olefinic hydrocarbon radical, is used, alone or in combination with other silanes or siloxanes, in sufficient amount to provide the necessary number of silicon-bonded hydrogen atoms in the organohydrogenpolysiloxane. Examples of hydrogen atom-containing silanes or siloxanes include, but are not limited to, $HMe_2SiCl$, $HMeSiCl_2$, $HSiCl_3$, $HMe_2SiOSiMe_2H$ and cyclo-$(MeHSiO)_4$. Component (B) is preferably prepared under non-alkaline conditions to minimize cleavage of Si-H linkages.

Component (C) of the composition of this invention can be any platinum group metal-containing catalyst component which facilitates the reaction of the silicon-bonded hydrogen atoms of Component (B) with the silicon-bonded hydroxy and/or silicon-bonded olefinic hydrocarbon radicals of Component (A). By platinum group it is meant herein ruthenium, rhodium, palladium, osmium, iridium and platinum.

Component (C) is preferably a platinum-containing catalyst component since they are most widely used and available and because they provide a more favorable effect for the compositions of this invention in terms of improved pot life and/or cure time, as hereinafter discussed. Platinum-containing catalysts can be platinum metal, optionally deposited on a carrier, such as silica gel or powdered charcoal; or a compound or complex of a platinum group metal. A preferred platinum-containing catalyst component in the compositions of this invention is a form of chloroplatinic acid, either as the commonly available hexahydrate form or as the anhydrous form, as taught by Speier, U.S. Pat. No. 2,823,218, incorporated herein by reference. Because of its easy dispersibility in organosilicon systems a particularly useful form of chloroplatinic acid is that composition obtained when it is reacted with an aliphatically unsaturated organosilicon compound such as divinyltetramethyldisiloxane, as disclosed by Willing, U.S. Pat. No. 3,419,593, incorporated herein by reference. Other platinum catalysts which are thought to be useful in the present invention include those disclosed in U.S. Pat. Nos. 3,159,601; 3,159,602; 3,220,972; 3,296,291; 3,516,946; 3,814,730 and 3,928,629, incorporated herein by reference.

The amount of platinum group metal-containing catalyst component that is used in the compositions of this invention is not narrowly limited as long as there is a sufficient amount to accelerate a room temperature reaction between the silicon-bonded hydrogen atoms of Component (B) with the silicon-bonded hydroxy and/or olefinic hydrocarbon radicals of Component (A) and not so much as to make its action uncontrollable by the use of Components (D) and (E), delineated below. The exact necessary amount of this catalyst component will depend upon the particular catalyst and is not easily predictable. However, for platinum-containing catalysts the amount can be as low as one part by weight of platinum for every one million parts by weight of organosilicon Component (A). Preferably said amount is at least 10 parts by weight, on the same basis. For compositions of this invention which are to be used in the coating method of this invention the amount of platinum-containing catalyst component to be used is sufficient to provide from 50 to 500, preferably 100 to 300, parts by weight platinum per one million parts by weight of organopolysiloxane Component (A).

Component (D) of the compositions of this invention is any material that is known to be, or can be, used as an inhibitor for the catalytic activity of platinum group metal-containing catalysts. By the term "inhibitor" it is meant herein a material that retards the room temperature curing of a curable mixture of Components (A), (B), and (C), when incorporated therein in small amounts, such as less than 10 percent by weight of the composition, without preventing the elevated temperature curing of the mixture. Of course, it is known that materials, such as hydrocarbons, which are not inhibitors when used in small amounts have an inhibiting effect when used in solvent amounts, such as from 35 to 95% by weight. These materials are not considered inhibitors for the purposes of this invention.

Inhibitors for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420 and 4,347,346; ethylenically unsaturated isocyanates, U.S. Pat. No. 3,882,083; olefinic siloxanes, U.S. Pat. No. 3,989,667; unsaturated hydrocarbon diesters U.S. Pat. Nos. 4,256,870; 4,476,166 and 4,562,096, and conjugated ene-ynes, U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; and various salts, such as U.S. Pat. No. 3,461,185. It is believed that the compositions of this invention can comprise an inhibitor from any of these classes of inhibitors.

Organic inhibitor compounds which bear aliphatic unsaturation and one or more polar groups, such as carbonyl or alcohol groups, display useful bath life extension benefits when combined with Component (E) of the present invention. Examples thereof include the acetylenic alcohols of Kookootsedes and Plueddemann, U.S. Pat. No. 3,445,420, such as ethynylcyclohexanol and methylbutynol; the unsaturated carboxylic esters of Eckberg, U.S. Pat. No. 4,256,870, such as diallyl maleate and dimethyl maleate; and the maleates and fumarates of Lo, U.S. Pat. Nos. 4,562,096 and 4,774,111 , such as diethyl fumarate, diallyl fumarate and bis-(methoxyisopropyl) maleate. The half esters and amides of Melanchon, U.S. Pat. No. 4,533,575; and the inhibitor mixtures of Eckberg, U.S. Pat. No. 4,476,166 would also be expected to behave similarly. The above-mentioned patents relating to inhibitors for platinum group metal-containing catalysts are incorporated herein by reference to teach how to prepare compounds which are suitable for use as Component D) in our compositions.

Preferred inhibitors for the compositions of this invention are the maleates and fumarates. It has been discovered that the compositions of this invention comprising a fumarate inhibitor have long bath lives, in spite of the weak inhibiting effect of the fumarate inhibitor, because Component (E) is included therein. Surprisingly their usual short cure times are not increased substantially by the presence of Component E). It has also been discovered that the compositions of this invention comprising a maleate have short cure times, in spite of the strong inhibiting effect of the maleate inhibitor, because a relatively low concentration of maleate can be used when Component (E) is included in the composition. Surprisingly their long bath lives are not decreased by this reduction in inhibitor concentration.

The maleates and fumarates that are preferred as Component (D) in the compositions of this invention have the formula $R^1(OD)_h O_2CCH=CHCO_2(DO)_h R^1$ wherein $R^1$ denotes an hydrocarbon radical having from 1 to 10 carbon atoms and each D denotes, independently, an alkylene radical having from 2 to 4 carbon atoms. $R^1$ can be, for example, an alkyl radical such as methyl, ethyl, propyl, isopropyl, butyl, pentyl or hexyl; an aryl radical such as phenyl or benzyl; an alkenyl radical such as vinyl or allyl; alkynyl radicals; or a cyclohydrocarbon radical such as cyclohexyl. D can be, for example, —CH$_2$CH$_2$—, —CH$_2$(CH$_3$)CH—, —CH$_2$CH$_2$CH$_2$—, —CH$_2$CH$_2$CH$_2$CH$_2$—, —CH$_2$(CH$_3$CH$_2$)CH— and —CH$_2$CH$_2$(CH$_3$)CH—. The individual $R^1$ radicals and D radicals of the maleates and fumarates can be identical or different, as desired. The value of subscript h in the formula immediately above can have a value equal to zero or 1. The individual values of h can be identical or different, as desired. It has been found that for composition of this invention wherein the organosilicon Component (A) is a linear polydiorganosiloxane bearing olefinic hydrocarbon radicals the fumarates, combined with Component (E), provide a superior curing action. Diethyl fumarate is preferred.

The amount of Component (D) to be used in the composition of this invention is not known to be critical and can be any amount that will retard the above-described catalyzed reaction at room temperature while not preventing said reaction at elevated temperature. No specific amount of inhibitor can be suggested to obtain a specified bath life at room temperature since the desired amount of any particular inhibitor to be used will depend upon the concentration and type of the platinum group metal-containing catalyst, the nature and amounts of Components (A) and (B) and the presence or absence of optional ingredients. While not wishing to limit the present invention by theory we believe that there should be at least on molecule of inhibitor for each platinum group metal atom in the composition, to form a room temperature stable complex therebetween. We further believe that there should be at least three molecules of maleate or fumarate inhibitor for each platinum group metal atom in the composition, to form a room temperature stable complex therebetween. In the liquid organopolysiloxane compositions that are used in the coating method of this invention the amount of inhibitor is typically sufficient to provide from 25 to 50 molecules thereof for every platinum group metal atom in the composition.

Maleates and fumarates added in small amounts, such as 0.1 weight percent based on the weight of Component (A), in compositions of this invention provide an increased bath life. A practical upper limit appears to be 0.2 percent for a maleate inhibitor and 2.0 percent for a fumarate inhibitor, on the same basis noted immediately above, if a cure time at 82° C. of less than 30 seconds is desired. Greater amounts of maleates and fumarates can be used if desired; however, drifting or long cure times may result.

Thus, while we have generally taught the broad and narrow limits for the inhibitor component concentration in our compositions the skilled worker can readily determine the optimum level thereof for each system, if desired.

Component (E) can be any compound which is effective for extending the bath life of a curable mixture of the above-delineated Components (A), (B), (C) and (D), when incorporated therein according to this invention; but which is ineffective for extending the bath life of the same mixture, absent said Component (D). In other words, Component (E) lacks an inhibiting effect on platinum group metal-containing catalysts by itself, yet increases the bath life of the composition when a platinum group metal-containing catalyst inhibitor is present. By the term "inhibiting effect" it is meant the room temperature cure-retarding effect of an inhibitor, as noted above.

In a preferred embodiment of this invention Component (E) can be any compound which increases the bath life, but not the 70° C. cure time, of a platinum-catalyzed composition which contains a fumarate of maleate inhibitor compound in an amount that is effective for providing less than 8 hours of bath life at 25° C.; yet does not have the same effect in an identical composition which is free of a fumarate or maleate inhibitor compound.

Our extensive experimentation indicates that Component (E) can be any organic or inorganic compound which is free of an inhibiting effect and has a Hansen partial solubility parameter for hydrogen-bonding of 8.0 or more, preferably 13-48. C. M. J. Hansen, *Journal of Paint Technology*. Volume 39, p. 104-105, (1967); and A. F. M. Barton, *CRC Handbook of Solubility Parameters and Other Cohesion Parameters*, p. 153-160, CRC Press, Inc. are included herein by reference to disclose Hansen partial solubility parameters for hydrogen-bonding and how to measure them. Preferred bath life extender compounds to be used as Component (E) in the compositions of this invention have the above-noted Hansen value of greater than 8.0, preferably 13-48, and are free of steric hindrance in the polar portion of the molecule.

General examples of preferred Component (E) include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol and 2-methoxyisopropanol; tetrahydrofuran; water and aqueous solutions of mineral acids, alkalis and salts. Useful increases in the gel time of a curable composition of this invention have been observed for these materials.

Primary and secondary alcohols, preferably having fewer than 10 carbon atoms, have been found to be especially effective in delaying the gelling of a composition of this invention at room temperature and are most preferred as Component (E). Examples thereof include methanol, 1-butanol, 2-butanol, tetradecanol and other alkanols, such as ethanol, normal-and iso-propanol, iso-butanol, and the normal-, secondary- and iso-pentanols, -hexanols, -heptanols and -octanols; benzyl alcohol, phenol and other aromatic alcohols such as methylphenyl carbinol, and 2-phenylethyl alcohol; allyl alcohol, cyclohexanol, etc. The particular choice of a Component (E) from this group of materials can depend on such factors as volatility, toxicity, flammability and odor of the Component (E) when considering the intended use of the composition. A preferred bath life extender for most compositions of this invention is benzyl alcohol.

The amount of Component (E) to be used in the compositions of this invention is not critical and is merely that amount that will provide a longer bath life for the composition than the bath life of an identical composition, but containing no Component (E).

The amount of Component (E) that can be used in the compositions of this invention can be as high as 10 percent or more by weight, based on the weight of Component (A); however, there seems to be little advantage of using such a large amount since superior results, with respect to bath life and cure time, can be obtained with a lesser amount. Preferably, the amount of Component (B) to be used in the compositions of this invention falls in the range of 0.1 to 5 percent, and most preferably 1 to 3 percent, by weight, based on the weight of Component (A).

At the same time the weight ratio of Component (E) to Component (D) in the compositions of this invention can have a value of from 20/1 to 1/20, but, typically has a value of from 10/1 to 1/3, and preferably a value of from 5/1 to 3/1.

The composition of this invention can contain any of the optional components commonly used in platinum group metal-catalyzed organosilicon compositions, such as reinforcing and extending fillers, hydrocarbon and halohydrocarbons free of aliphatic unsaturation, colorants, stabilizers, adhesion modifiers, adhesive-release modifiers, etc. In particular, the coating compositions of this invention which have adhesive-releasing properties can further comprise the well-known high release additives of the art. In this regard the disclosures of Sandford, U.S. Pat. No. 4,123,604; Keil, U.S. Pat. No. 3,527,659; and Rivers-Farrell et al., U.S. Pat. No. 4,611,042 are noted.

The compositions of this invention can be prepared by homogeneously mixing Components (A), (B), (C), (D) and (E), and any optional components, using suitable mixing means, such as a spatula, a drum roller, a mechanical stirrer, a three-roll mill, a sigma blade mixer, a bread dough mixer, and a two-roll mill.

The order of mixing Components (A) to (E) is not critical; however, it is highly preferred that Components (B) and (C) be brought together in the presence of Components (D) and (E), most preferably in a final mixing step. It is highly preferred to admix Component (D to C), followed by (A), then (E) and finally (B).

It is possible to mix all components in one mixing step immediately prior to using the curable composition. Alternatively, certain components can be premixed to form two or more packages which isolates (C) from (B) and/or (A) and which can be stored for months, if desired, and then mixed in a final step immediately prior to the intended use thereof. For example Components (C), (D), (E), and a portion of Component (A), along with optional components such as fillers and solvents, if desired, can be mixed to provide a first package and component (B) and any remaining Component (A) can be mixed to provide a second package. These two packages can then be stored until the composition of this invention is desired and then homogeneously mixed. It is also possible to place Components (B), (C), (D) and (E) in four separate packages and to place Component (A) in one or more of said separate packages and the four packages stored until needed.

The compositions of this invention have utility as formable compositions to provide organosilicon articles such as O-rings, tubing, wire-coating and gaskets; as encapsulant and sealant compositions; and as coating compositions, among others. They can be cured with heat and/or actinic radiation, such as electron beam radiation or ultraviolet light radiation.

In another aspect the present invention relates to a process comprising forming a liquid composition into a shaped article and subjecting the article to heat and/or actinic radiation for a period of time sufficient to convert the article to the solid state, said liquid composition comprising (A) an organosilicon compound having an average of at least two curing radicals per molecule thereof selected from the group consisting of the hydroxy radical and olefinic hydrocarbon radicals, (B) an organohydrogensilicon compound containing an average of at least two silicon-bonded hydrogen atoms per molecule thereof, the amounts of Components (A) and (B) being sufficient to provide a ratio of the number of silicon-bonded hydrogen atoms to the number of silicon-bonded curing radicals of from 1/100 to 100/1, (C) a platinum group metal-containing catalyst in sufficient amount to accelerate a curing reaction among said silicon-bonded curing radicals and said silicon-bonded hydrogen atoms, D) an inhibitor compound for said accelerated curing reaction in a total amount sufficient to retard the curing reaction at room temperature but insufficient to prevent said reaction at elevated temperature, and (E) a bath life extender compound in a total amount sufficient to further retard the curing reaction at room temperature.

In the process of this invention the liquid curable composition is a composition of this invention comprising Components (A), B), (C), (D) and (E) which are delineated above, including preferred embodiments thereof. The amounts of Components (A), (B), (C), (D) and (E) that are used in the curable compositions of this invention are also as stated above.

A significant characteristic of the liquid curable compositions of this invention is a long pot life whereby the viscosity of the composition does not double in value over a period of several hours, thereby allowing an extended work time. Another significant characteristic of the process of this invention is the rapid curing that occurs when the coated composition is heated to low elevated temperatures, such as 70° C.

Typically, the compositions of this invention will remain formable for 8 hours or more at room temperature yet will cure fully, in thin section, when heated at 70° C. for 30 seconds. Higher heating temperatures, such as up to 150° C., will provide correspondingly shorter curing times.

Thus the process of this invention comprises, in a particular aspect, forming at least a portion of the curable composition into an article 8 hours or more after the curable composition has been prepared and heating the article at a temperature of about 70° to 150° C. for 30 seconds or less. For example, a composition of this invention can be prepared and then used to coat a substrate for more than 8 hours and be curable in 30 seconds or less at 70° C. in thin section at any time in the life of the bath. Alternatively, a composition of this invention can be prepared, stored for more than 8 hours and then be formed into an article and be curable in 30 seconds or less at 70° C. in thin section at any time during the life of the bath.

In the process of this invention the liquid composition is formed into an article having a desired shape, using any suitable means, such as by molding, extruding, spreading, foaming, spraying, blowing, dripping, emulsifying, pouring, and the like. The liquid curable composition can have any consistency, such as pourable, spreadable, gum-like or thixotropic, as long as it can be formed into a desired shape. The formed article is then caused to cure to the solid, i.e., non-flowing state, at least sufficiently to keep it in its desired shape.

The solid article can have any consistency in its fully cured state, such as a gel, an elastomer or a rigid body, depending upon the make-up of the curable composition and the curing conditions that were use in its preparation.

In the process of this invention the liquid compositions of this invention can be cured, partially or fully, by any suitable means. For example, as noted above, the curable composition can be heated, exposed to actinic radiation or heated and exposed to actinic radiation. For shaped articles having a thin dimension, such as up to about 1/8 inch, any of the above-mentioned curing means can be used. For shaped articles having no thin dimension exposure to actinic radiation, particularly low-energy radiation, alone may be insufficient to fully cure the shaped article.

By actinic radiation it is meant ultraviolet light; electron beam radiation; and alpha-, beta-, gamma- and x-rays. By heat it is meant infrared radiation, hot-air, microwave radiation, etc. Of course actinic radiation is frequently accompanied by heat and the use of a combination of the two falls within the scope and spirit of the present process.

In a preferred embodiment the present invention relates to a process for rendering the surface of a solid substrate less adherent to materials that normally adhere thereto, said process comprising (I) applying to said surface a coating of a liquid curable composition comprising (A) an organosilicon compound having the formula $XR_2SiO(RXSiO)_xSiR_2X$ wherein R denotes a monovalent hydrocarbon or halohydrocarbon radical free of aliphatic unsaturation and having 1-20 carbon atoms, at least 50 percent of all R radicals being methyl, X denotes a radical selected from the group consisting of olefinic hydrocarbon radicals having from 2 to 20 carbon atoms and R radicals, an average of at least two X radicals per molecule of Component (A) being olefinic hydrocarbon radicals, x has an average value sufficient to provide a viscosity at 25° C. of at least 25 millipascal-seconds for the Component (A); (B) an organohydrogensilicon compound having the formula $YR_2SiO(RYSiO)_ySiR_2Y$ wherein R denotes a monovalent hydrocarbon or halohydrocarbon radical free of aliphatic unsaturation and having 1-20 carbon atoms, at least 50 percent of all R radicals being methyl, Y denotes a hydrogen atom or an R radical, an average of at least two Y radicals per molecule of Component (B) being hydrogen atoms, y has average values sufficient to provide a viscosity at 25° C. of from 1 to 100 millipascal-seconds for the Component (B), the ratio of the amounts of (A) to (B) being sufficient to provide from 0.5 to 2 silicon-bonded hydrogen atoms for every silicon-bonded olefinic hydrocarbon radical; (C) a platinum-containing compound in sufficient amount to accelerate the curing reaction among said silicon-bonded curing radicals and said silicon-bonded hydrogen atoms; (D) an inhibitor compound having the formula $R^1(OD)_hO_2CCH=CHCO_2(DO)_hR^1$, wherein each $R^1$ denotes, independently, a monovalent hydrocarbon radical, and h has a value of 0 or 1, in a total amount sufficient to retard the curing reaction at room temperature but insufficient to prevent said reaction at elevated temperature, and (E) a bath life extender compound comprising a compound bearing a primary or secondary alcohol radical, in a total amount sufficient to further retard the curing reaction of the mixture at room temperature; and (II) subjecting the applied coating to heat and/or actinic radiation for a period of time sufficient to cure the applied coating.

In the preferred process of this invention the coating process can be accomplished by any suitable manner known in the art, such as by spreading, brushing, extruding, spraying, gravure, kiss-roll and air-knife.

In a preferred embodiment of the instant process the solid substrate is a flexible sheet material such as paper, polyolefin film and polyolefin-coated paper or foil. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the solid substrate can be substantially sheet-like, such as a peelable release liner for pressure sensitive adhesive; a fabric or a foil; or substantially three-dimensional in form.

After the liquid curable composition has been coated onto a substrate it is heated and/or irradiated with actinic radiation, as noted herein, to cure the liquid coating and to adhere it to the substrate.

In a preferred embodiment of the process of this invention a flexible sheet material, such as paper, metal foil or tapestock, is coated with a thin coating of the liquid curable composition, preferably in a continuous manner, and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types, or silicone-based, such as the peroxide- or platinum-curable polydiorganosiloxane-based adhesives.

The process of this invention is also applicable to adhesive materials, other than pressure sensitive adhesives. Examples of said adhesive materials include foods, asphalt and gum polymers.

The following examples are disclosed to further teach, but not limit, the invention which is properly delineated by the appended claims. All amounts (parts and percentages) are by weight unless otherwise indicated. Viscosities were measured with a rotating spindle viscometer.

Bath life of a composition means the time interval required for the freshly prepared composition to gel at room temperature.

Cure time for a composition means the time interval required for the composition, when coated onto S2S kraft paper, at a thickness of 1 pound per ream, to attain the no smear, no migration, no rub-off condition.

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

A 5-hexenyldimethylsiloxane-endblocked copolymer of dimethylsiloxane units and 5-hexenylmethylsiloxane units having the average formula $HexMe_1SiO(Me_2SiO)_{151}(MeHexSiO)_3SiMe_2Hex$, where Me denotes methyl and Hex denotes $CH_2=CHCH_2CH_2CH_2CH_2—$, was prepared according to U.S. Pat. No. 4,609,574 by mixing cyclopolydimethylsiloxanes, the hydrolyzate of 5-hexenylmethyldichlorosilane, 5-hexenyl-endblocked polydimethylsiloxane fluid, and KOH in a flask and heating to 150° C. for 5 hours. After cooling, the mixture was treated with carbon dioxide for 30 minutes to neutralize the KOH. Fuller's Earth (5 g) was added and after 24 hours, the mixture as filtered to yield the copolymer.

U.S. Pat. No. 4,609,574 is incorporated herein by reference to disclose the details of how to prepare the copolymer delineated immediately above, and other 5-hexenylsubstituted silicon compounds such as HexMeSiCl$_2$ and HexMe$_2$SiCl and other polymers, such as the hydrolyzate of HexMeSiCl$_2$ and hexenylendblocked polydimethylsiloxane fluid.

EXAMPLES 1 TO 37

Several curable coating compositions were prepared by mixing, in the order given, 100 g of the 5-hexenylendblocked copolymer of 5-hexenylmethylsiloxane units and dimethylsiloxane units and, noted above; an amount of an inhibitor, noted in Table I; an amount of a bath life extender, noted in Table I; 2.0 g of a platinum catalyst (a soluble platinum complex containing 0.67% platinum formed from chloroplatinic acid and divinyltetramethyldisiloxane); and 4.0 g of an organohydrogenpolysiloxane having the average formula Me$_3$SiO(Me$_2$SiO)$_{12}$(MeHSiO)$_{28}$SiMe$_3$.

Comparison compositions a-g were prepared identically except either the inhibitor or the bath life extender was omitted. These compositions are also included in Table I.

The bath life at 25° C. (77° F.) of each of the example coatings and comparison coatings were determined. In addition, the cure time at 82.2° C. (180° F.) of most of the freshly prepared compositions and of several aged compositions were also measured. The results are summarized in Table I. The data of Table I are arranged in order of increasing inhibitor concentration and decreasing bath life at constant inhibitor concentration.

These data show the following. Two parts of DEF (Exs. a-c) is needed to get adequate bath life in a composition of the art which does not contain a bath life extender; however, the consequence is a drifting, albeit short, cure time. Using less DEF, in conjunction with certain preferred bath life extenders (Exs. 3-15), provides improved bath life and a short, stable cure time, compared to an identical composition except containing no bath life extender. Higher levels of DEF, in conjunction with preferred bath life extenders (Exs. 30-34), can be used to restore original bath life, if desired, without the attendant cure time drift observed in the comparison compositions. Some improvement is available from other bath life extenders (Exs. 16-24); however, these materials are not preferred. Some polar materials (Exs. 25-28), although having high hydrogen-bonding partial solubility parameters, contain amine groupings or steric hindrance and provide no improvement in the bath life of the composition.

With respect to MIM these data show that 1 part of MIM (Exs. d and e) is needed to get adequate bath life in a composition of the art which does not contain a bath life extender; however, the consequence is long, albeit stable, cure time. Using less MIM, in conjunction with certain preferred bath life extenders (Exs. 35-37), provides improved bath life, compared to an identical composition except containing no Component E), and a short, stable cure time.

TABLE I

| Ex. | Extender* Ident | Amt | Inhibitor* Ident | Amt | BATH LIFE, Hrs. @ 25° C. | CURE TIME, Sec. @ 82° C. INITIAL | ( ) Hour |
|---|---|---|---|---|---|---|---|
| 1. | BzOH | .90 | DEF | .10 | <20 | 7 | — |
| 2. | EGMME | .90 | DEF | .10 | <0.5 | 5 | — |
| 3. | MeOH | .75 | DEF | .25 | >96 | 7 | 10(24) |
| 4. | 1BuOH | .75 | DEF | .25 | >96 | 7 | 12(24) |
| 5. | 2BuOH | .75 | DEF | .25 | >96 | 7 | 15(24) |
| 6. | BzOH | .75 | DEF | .25 | >96 | 7 | 12(24) |
| 7. | EGMME | .75 | DEF | .25 | >48 | 10 | 18(24) |
| 8. | H$_2$O | .75 | DEF | .25 | >24 | 10 | — |
| 9. | CDMSN | .75 | DEF | .25 | 24 | 10 | 10(24) |
| 10. | Ac$_2$O | .75 | DEF | .25 | 15 | 15 | — |
| 11. | THF | .75 | DEF | .25 | 13 | 10 | 20(3.5) |
| 12. | C$_{14}$OH | .75 | DEF | .25 | 10 | 10 | 20(7.5) |
| 13. | 5% H$_2$+ | 2.0 | DEF | .25 | 10 | — | — |
| 14. | 5% OH− | 2.0 | DEF | .25 | 10 | — | — |
| 15. | 5% H+ | 2.0 | DEF | .25 | 10 | — | — |
| 16. | EG | .75 | DEF | .25 | 2 | 15 | — |
| 17. | PDMS | 9.75 | DEF | .25 | 1.8 | rub-off | — |
| 18. | Glycer | .75 | DEF | .25 | 1.5 | 15 | — |
| 19. | HOAc | .75 | DEF | .25 | 1.5 | 10 | 15(1.1) |
| 20. | tBuOH | .75 | DEF | .25 | <1.5 | 7 | — |
| 21. | EHA | .75 | DEF | .25 | 1.0 | 10 | — |
| 22. | ECNM | .75 | DEF | .25 | 1.0 | 7 | — |
| 23. | C$_3$H$_6$O | 2.0 | DEF | .25 | 0.8 | 8 | — |
| 24. | EtOAc | .75 | DEF | .25 | 0.5 | 7 | — |
| 25. | Ph$_2$O | .75 | DEF | .25 | 0.33 | 15 | — |
| 26. | PhCHO | .75 | DEF | .25 | 0.3 | 15 | — |
| 27. | C$_5$H$_5$N | .75 | DEF | .25 | 0.25 | 10 | — |
| 28. | DMAPA | .75 | DEF | .25 | <1 min. | — | — |
| 29. | EHA | .25 | DEF | .75 | 5 | 10 | — |
| 30. | EGMME | .26 | DEF | .74 | >168 | 10 | 20(24) |
| 31. | BzOH | .26 | DEF | .74 | >168 | 10 | 20(27) |
| 32. | MeOH | 2.4 | DEF | .99 | >168 | 12 | 25(7) |
| 33. | BzOH | 9.65 | DEF | .95 | 144 | 12 | 25(7) |
| 34. | MeOH | 9.65 | DEF | .95 | 96 | 12 | 25(7) |
| 35. | BzOH | .95 | MIM | .05 | <1 | 7 | — |
| 36. | BzOH | .90 | MIM | .10 | 3 | 17 | 17(2) |
| 37. | BzOH | .80 | MIM | .20 | >72 | 30 | 30(17) |
| a. | None | — | DEF | .25 | 0.3 | 7 | — |
| b. | None | — | DEF | 1.0 | 1 | 10 | — |
| c. | None | — | DEF | 2.0 | >168 | 12 | 40(7) |
| d. | None | — | MIM | .20 | 0.5 | 30 | — |
| e. | None | — | MIM | 1.0 | >168 | 75 | 80(24) |
| f. | ECNM | 1.0 | None | — | 0 | — | — |
| g. | BzOH | 1.0 | None | — | 0 | — | — |

*See Table II for explanation of Ident.

TABLE II

| Component Identity Code | Compound | Hydrogen Bonding Partial Solubility Parameter |
|---|---|---|
| Ac$_2$O | Acetic anhydride | 10.2 |
| 1BuOH | 1-Butanol | 15.8 |
| 2BuOH | 2-Butanol | 14.5 |
| tBuOH | t-Butanol | 16.0 |
| BzOH | Benzyl alcohol | 13.7 |
| C$_3$H$_6$O | Acetone | 7.0 |
| C$_5$H$_5$N | Pyridine | 5.9 |
| C$_{14}$OH | Tetradecanol | — |
| CDMSN | Cyclodimethylpolysilazane | — |
| DEF | Diethyl fumarate | — |
| DMAPA | Dimethylaminopropylamine | — |
| ECNM | Ethyl cinnamate | 4.1 |
| EG | Ethylene glycol | 26.0 |
| EGMME | Ethylene glycolmonomethyl ether | 16.4 |
| EHA | Ethylhexanoic acid | 8.2 |
| EtOAc | Ethyl acetate | 7.2 |
| Glycer | Glycerine | 29.3 |
| 5% H+ | Aqueous HCl | — |
| HOAc | Acetic Acid | 13.5 |
| H$_2$O | Water | 48.0 |
| 5% H$_2$++ | Aqueous H$_2$SO$_4$ | — |

TABLE II-continued

| Component Identity Code | Compound | Hydrogen Bonding Partial Solubility Parameter |
|---|---|---|
| MeOH | Methanol | 22.3 |
| MIM | Bis-(2-methoxyisopropyl) maleate | — |
| 5% OH⁻ | Aqueous NaOH | — |
| PDMS | Polydimethylsiloxane | — |
| Ph₂O | Diphenyl ether | — |
| PhCHO | Benzaldehyde | 5.3 |
| THF | Tetrahydrofuran | 8.0 |

EXAMPLES 38 TO 42

Five coating composition of this invention (Compositions 38 to 42) were prepared by mixing, in the order given, 100 g of a vinyl-endblocked copolymer of dimethylsiloxane units and vinylmethylsiloxane units having the average formula ViMe$_2$SiO(Me$_2$SiO)$_{151}$(MeViSiO)$_3$SiMe$_2$Vi where Me denotes methyl and Vi denotes CH$_2$=CH— (prepared by mixing cyclopolydimethylsiloxanes, cyclopolymethylvinylsiloxanes, vinyl-endblocked polydimethylsiloxane fluid, and KOH in a flask and heating as was done for the hexenyl-substituted polymer noted above), 2.0 g of the platinum catalyst of Examples 1 to 37, an amount of diethyl fumarate, noted in Table III; an amount of benzyl alcohol, noted in Table III; and 4.0 g of the methylhydrogenpolysiloxane crosslinker of Examples 1 to 37. For comparison, a coating compositions (Compositions h) was identically prepared, except containing no benzyl alcohol.

The bath life at 25° and 40° C., and cure time at 82.2° C. for freshly prepared and aged samples, of each of the example coatings and comparison coatings were determined and the results are summarized in Table III.

TABLE III

| Ex. | BzOH.* pph | DEF* pph | BATH LIFE 25° C. | BATH LIFE 40° C. | CURE TIME Sec. @ 82° C. INITIAL | CURE TIME Sec. @ 82° C. ( ) Hour |
|---|---|---|---|---|---|---|
| 38. | 0.75 | 0.25 | 24 | — | 20 | 55(16) |
| 39. | 2.00 | 2.00 | >48 | >36 | 20 | 55(5) |
| 40. | 4.00 | 2.00 | >48 | >36 | 20 | 45(5) |
| 41. | 6.00 | 2.00 | >48 | 36 | 20 | 35(5) |
| 42. | 8.00 | 2.00 | >48 | >36 | 20 | 40(5) |
| h. | — | 2.00 | >48 | 24 | 20 | 70(5) |

*BzOH is benzyl alcohol. DEF is diethyl fumarate.

EXAMPLE 43

This example is presented to illustrate a utility of the composition of this invention.

A curable coating composition of this invention was prepared by mixing, in the order given, 100 g of the 5-hexenyl-endblocked copolymer of 5-hexenylmethylsiloxane units and dimethylsiloxane units, noted above; a mixture of 0.72 g of diethyl fumarate and 1.95 g of a platinum catalyst (a soluble platinum complex containing 0.67% platinum formed from chloroplatinic acid and divinyltetramethyldisiloxane); 0.31 g of benzyl alcohol; and 4.0 g of an organohydrogenpolysiloxane having the average formula Me$_3$SiO(Me$_2$SiO)$_{12}$(MeHSiO)$_{28}$SiMe$_3$.

The viscosity of the coating at 40° C. (104° F.) was found to range from 365 to 408 mPa.s (centipoise) over an 8 hour period. The cure time of the freshly prepared composition was found to be 15 seconds, 5 seconds and less than 5 seconds at 82.2° C. (180° F.), 115.5° C. (240° F.) and 148.9° C. (300° F.), respectively.

For comparison a compositions (i) of the prior art was prepared by mixing, in the order given, 100 g of the 5-hexenyl-endblocked copolymer of 5-hexenylmethylsiloxane units and dimethylsiloxane units, noted above; 0.83 g of bis(2-methoxyisopropyl) maleate; 1.95 g of a platinum catalyst (a soluble platinum complex containing 0.67% platinum formed from chloroplatinic acid and divinyltetramethyldisiloxane); and 4.0 g of an organohydrogenpolysiloxane having the average formula Me$_3$SiO(Me$_2$SiO)$_{12}$(MeHSiO)$_{28}$SiMe$_3$.

The viscosity of the comparison coating at 40° C. (104° F.) was found to range from 378 to 698 mPa.s (centipoise) over an 8 hour period. The cure time of the freshly prepared composition was found to be 50 seconds, 15 seconds and less than 5 seconds at 82.2° C. (180° F.), 115.5° C. (240° F.) and 148.9° C. (300° F.), respectively.

The freshly prepared compositions were coated onto 54 pound paper and samples of the coated paper were heated at 180°, 240° or 300° F. for various lengths of time and the thus-cured coatings were laminated, in-line, with an acrylic adhesive (GMS-263; Monsanto, St. Louis, Mo.). The adhesive solution was applied to the coatings at a wet thickness of 3 mils using a drawdown bar. The applied adhesive was air-dried at room temperature for one minute, heated at 70° C. for one minute and the cooled to room temperature for one minute. A sheet of 60 pound matte litho was applied to the dried adhesive and the resulting laminates were pressed with a 4.5 pound rubber-coated roller. The test laminates were then aged at room temperature for 1 day and cut into 1-inch strips. Adhesive release testing was done by pulling the substrate/coating from the matte/adhesive of the 1-inch strips at an angle of 180 degrees and at a rate of 10 meters per minute. The force needed to separate the adhesive/coating interface was noted several times during the separation and adhesive release was noted as an average of the several readings.

The release values, listed in Table IV, show that the compositions of this invention are more efficient in an in-line process of adhesive lamination than a composition of the prior art. In other words, a composition of the prior art, noted for its utility as a release coating for receiving an acrylic adhesive, in-line, requires a heating time of 130 seconds at 180° F. to provide a laminate having a release which is similar to the composition of this invention which was heated for only 50 seconds. This advantage is found at higher temperatures as well, albeit to a lesser degree.

TABLE IV

| Cure Conditions Seconds/°F. | Adhesive Release g/in. Comparison (i) | Adhesive Release g/in. Example 43 |
|---|---|---|
| 50/180 | Tear | 133 |
| 90/180 | 210 | 90 |
| 130/180 | 145 | 65 |
| 20/240 | 95 | 80 |
| 40/240 | 58 | 50 |
| 80/240 | 50 | 40 |
| 10/300 | 65 | 60 |
| 20/300 | 56 | 53 |
| 40/300 | 40 | 30 |

EXAMPLES 49 TO 50

Several curable coating compositions were prepared by mixing 100 g of the 5-hexenyl-endblocked copolymer of 5-hexenylmethylsiloxane units and dimethylsiloxane units and, noted above; an amount of an inhibitor, noted in Table V; an amount of a bath life extender, noted in Table V; 2.0 g of a platinum catalyst (a soluble platinum complex containing 0.67% platinum formed from chloroplatinic acid and divinyltetramethyldisiloxane); and an amount of an organohydrogenpolysiloxane, noted in Table V, having the average formula Me$_3$SiO(Me$_2$SiO)$_{12}$(MeHSiO)$_{28}$SiMe$_3$ (B-1); or Me$_3$SiO(MeHSiO)$_{35}$SiMe$_3$ (B-2); or a 50/50 mixture (B-3) of organohydrogenpolysiloxanes having the formulae Me$_3$SiO(Me$_2$SiO)$_3$(MeHSiO)$_5$SiMe$_3$ and Me$_3$SiO(MeHSiO)$_{35}$SiMe$_3$.

Comparison compositions j-1 were prepared identically except either the bath life extender or the crosslinker was omitted. These compositions are also included in Table V.

The compositions were coated onto paper and exposed to ultraviolet light, using a two-lamp PPG coater. The maximum web speed that permitted a full cure of the composition was measured and converted to exposure time in seconds. The results are summarized in Table V. These data show that the compositions of this invention are readily curable by UV.

The UV-induced cure rate is independent of the identity of the crosslinker (Exs. 44–46 and 1) or the amount of bath life extender (Exs. 46 vs 47; 48 vs j and 50 vs k). The UV-induced cure rate is dependent on the amount and type of inhibitor (Exs. 47–50).

TABLE V

| Ex. | Extender* Ident | Amt | Inhibitor* Ident | Amt | CROSS-LINKER Ident | Amt | CURE TIME Seconds |
|---|---|---|---|---|---|---|---|
| 44. | BzOH | .40 | DEF | .80 | B-3 | 3.6 | 0.6 |
| 45. | BzOH | .40 | DEF | .80 | B-2 | 3.0 | 0.7 |
| 46. | BzOH | .40 | DEF | .80 | B-1 | 4.0 | 0.6 |
| 47. | BzOH | 1.00 | DEF | .80 | B-1 | 4.0 | 0.6 |
| 48. | BzOH | 3.00 | DEF | 3.0 | B-1 | 4.0 | 1.3 |
| 49. | BzOH | 1.00 | MIM | .80 | B-1 | 4.0 | 1.5 |
| 50. | BzOH | 1.60 | MIM | .40 | B-1 | 4.0 | 1.3 |
| j. | None | — | DEF | 3.0 | B-1 | 4.0 | 1.3 |
| k. | None | — | MIM | .40 | B-1 | 4.0 | 1.3 |
| 1. | BzOH | .40 | DEF | .80 | — | 0.0 | >10 |

*See Table II for explanation of Ident.

EXAMPLE 51

A coating composition of this invention was prepared by mixing 100 g of the vinyl-endblocked copolymer of dimethylsiloxane units and vinylmethylsiloxane units noted in Examples 38–42, 2.0 g of the platinum catalyst of Examples 1 to 37, 0.8 g of diethyl fumarate, 1 g of benzyl alcohol, and 5.3 g of the methylhydrogenpolysiloxane crosslinker of Example 44. The bath life at 25° and UV-cure time for the composition were determined to be >168 hours and 0.8 seconds, respectively.

EXAMPLE 52

The freshly prepared composition of Example 46 was coated onto 54 pound paper and on polypropylene film and the samples were exposed to UV light, using a two-lamp PPG coater. The coating on the polypropylene film cured at 115 feet/minute while the coating on paper cured at 135 feet/minute. The thus-cured coatings were laminated, in-line, with an acrylic adhesive (GMS-263; Monsanto, St. Louis, Mo.) or with National Starch 36-6149 SBR adhesive. The adhesive solution was applied, and samples were prepared and tested for adhesive release, as noted above.

The release values, listed in Table VI, show that the compositions of this invention can be rapidly and thoroughly cured by UV light in an in-line process to provide liner for the release of various types of adhesives.

TABLE VI

| Substrate | Adhesive | Adhesive Release g/in. | | |
|---|---|---|---|---|
| | | 1 Day | 2 Days | 14 Days |
| Paper | Acrylic | 111.1 | 68.1 | 62.8 |
| Paper | SBR | 45.9 | 39.8 | 39.7 |
| PP | Acrylic | 22.0 | 18.4 | 15.1 |
| PP | SBR | 12.9 | 11.3 | 10.5 |

EXAMPLES 53–58

Several compositions of this invention, identical to that of Example 46 except containing various amounts and types of platinum-containing catalysts, were prepared. Compositions 53–57 contained the catalyst of Compositions 1–37. Composition 58 contained H$_2$PtCl$_6$.6H$_2$O. The results, listed in Table VII show that the UV-initiated cure rate and the bath life of the compositions of this invention are dependent upon the type and concentration of the catalyst component (C).

TABLE VII

| Ex. | CATALYST Amt | CURE TIME Seconds | BATH LIFE Days @ 25° C. |
|---|---|---|---|
| 53 | 0.4 | 1.3 | >7 |
| 54 | 0.8 | 0.9 | >7 |
| 55 | 1.6 | 0.9 | >7 |
| 56 | 2.0 | 0.6 | >7 |
| 57 | 3.0 | 0.6 | 2-5 |
| 58 | 2.0 | 3.0 | >7 |
| 59 | 2.0 | 0.8 | >7 |
| 60 | 2.0 | 3.0 | >7 |

EXAMPLES 59 and 60

Compositions 59 and 60, identical to those of Examples 56 and 58, respectively, were prepared, except using 88 g of the polymer used in the compositions of Examples 38–42 instead of the 100 g of hexenyl-substituted polymer. The UV-initiated cure rate and the bath life of these compositions are also listed in Table VII.

EXAMPLE 61

The composition of Example 52 was coated onto polypropylene film and exposed to 2 megarads of electron beam radiation in air or in nitrogen. Fully cured coatings were obtained.

EXAMPLES 62 and 63

Three compositions were prepared as disclosed in Examples 1–37, except using either 1 part of crude ethylphenyl fumarate (Example 62), or 1 part of pure ethylphenyl fumarate (Comparison), or 1 part of a mixture of pure ethylphenyl fumarate and phenol (Example 63) as the cure control component. Crude ethylphenyl fumarate was prepared by reacting excess phenol with the monoethyl ester of fumaryl chloride in the presence of base. The composition containing crude ethylphenyl fumarate had a room temperature bath life of more than 10 days and a non-drifting cure time of 20 seconds at 180° F. The composition containing pure ethylphenyl fumarate had a room temperature bath life of less than 1 day. The composition containing the mixture of pure ethylphenyl fumarate and phenol had the performance of the composition containing crude ethylphenyl fumarate.

That which is claimed is:

1. A process for rendering the surface of a solid substrate less adherent to materials that normally adhere thereto, said process comprising (I) applying to said surface a coating of a liquid curable composition comprising (A) an organosilicon compound having the formula $XR_2SiO(RXSiO)_xSiR_2X$ wherein R denotes a monovalent hydrocarbon or halohydrocarbon radical free of aliphatic unsaturation and having 1–20 carbon atoms, at least 50 percent of all R radicals being methyl, X denotes a radical selected from the group consisting of olefinic hydrocarbon radicals having from 2 to 20 carbon atoms and R radicals, an average of at least two X radicals per molecule of Component (A) being olefinic hydrocarbon radicals, the subscript x has an average value sufficient to provide a viscosity at 25° C. of at least 25 millipascal-seconds for the Component (A);

(B) an organohydrogensilicon compound having the formula $YR_2SiO(RYSiO)_ySiR_2Y$ wherein R denotes a monovalent hydrocarbon or halohydrocarbon radical free of aliphatic unsaturation and having 1–20 carbon atoms, at least 50 percent of all R radicals being methyl, Y denotes a hydrogen atom or an R radical, an average of at least two Y radicals per molecule of Component (B) being hydrogen atoms, the subscript y has average values sufficient to provide a viscosity at 25° C. of from 1 to 100 millipascal-seconds for the Component B), the ratio of the amounts of (A) to (B) being sufficient to provide from 0.5 to 2 silicon-bonded hydrogen atoms for every silicon-bonded olefinic hydrocarbon radical;

(C) a platinum-containing compound in sufficient amount to accelerate the curing reaction among said silicon-bonded curing radicals and said silicon-bonded hydrogen atoms;

(D) an inhibitor compound for said accelerated curing reaction having the formula $R^1(OD)_hO_2CCH=CHCO_2(DO)_hR^1$, wherein $R^1$ denotes, independently, a monovalent hydrocarbon radical having from 1 to 10 carbon atoms, each D denotes, independently, an alkylene radical having from 2 to 4 carbon atoms, and the subscript h has a value of 0 or 1, in a total amount sufficient to retard the curing reaction at room temperature but insufficient to prevent said reaction at elevated temperature; and (E) a bath life extender compound selected from the group consisting of compounds containing at least one primary or secondary alcohol radical, carboxylic acids, compounds which yield carboxylic acids when exposed to water at room temperature, cyclic ethers, and water, in a total amount sufficient to further retard the curing reaction at room temperature; and (II) subjecting the applied coating to heat and/or actinic radiation for a period of time sufficient to cure the applied coating.

2. A process in accordance with claim 1 wherein at least a portion of the composition is applied to a substrate more than 8 hours after the components thereof were mixed and the applied coating is heated at a temperature of from 70° to 150° C. for 30 seconds or less.

3. A process in accordance with claim 1 wherein Component (A) has the formula $XMe_2SiO(Me_2SiO)_b(MeXSiO)_dSiMe_2X$ wherein Me denotes methyl, X denotes a radical selected from the group consisting of olefinic hydrocarbon radicals having from 2 to 20 carbon atoms and methyl radicals, an average of at least two X radicals per molecule of Component (A) being olefinic hydrocarbon radicals, the subscripts b and d have average values of zero or more, and the sum of b plus d has a value sufficient to provide a viscosity at 25° C. of at least 25 millipascal-seconds for the Component (A) and Component (B) has the formula $YMe_2SiO(Me_2SiO)_p(MeYSiO)_qSiMe_2Y$ wherein Y denotes a hydrogen atom or a methyl radical, an average of at least two Y radicals per molecule of Component (B) being hydrogen atoms, the subscripts p and q have average values of zero or more, the sum of p plus q has a value sufficient to provide a viscosity at 25° C. of from 1 to 100 millipascal-seconds for the Component B), the ratio of the amounts of (A) to (B) being sufficient to provide from 0.5 to 2 silicon-bonded hydrogen atoms for every silicon-bonded olefinic hydrocarbon radical; Component (C) is a vinyl-siloxane complex of chloroplatinic acid; Component (D) is a fumarate having the formula $R^1(OD)_hO_2CCH=CHCO_2(DO)_hR^1$; and Component (E) is a primary or secondary alcohol.

4. A process according to claim 3 wherein the substrate is a flexible sheet material.

5. A process according to claim 4 wherein the flexible sheet material is paper.

6. A process according to claim 4 further comprising (III) releasably adhering a pressure sensitive adhesive composition to the cured applied coating.

7. A process in accordance with claim 3 wherein Component (A) has the formula $HexMe_2SiO(Me_2SiO)_b(MeHexSiO)_dSiMe_2Hex$, wherein Hex denotes $CH_2=CHCH_2CH_2CH_2CH_2-$, Component (B) has the formula $Me_3SiO(Me_2SiO)_p(MeHSiO)_qSiMe_3$, Component (D) is diethyl fumarate and Component (E) is benzyl alcohol.

8. A process in accordance with claim 3 wherein Component (A) has the formula $ViMe_2SiO(Me_2SiO)_b(MeViSiO)_dSiMe_2Vi$, wherein Vi denotes $CH_3=CH-$, Component (B) has the formula $Me_3SiO(Me_2SiO)_p(MeHSiO)_qSiMe_3$, Component (D) is diethyl fumarate and Component (E) is benzyl alcohol.

* * * * *